United States Patent [19]
Bakardjiev et al.

[11] Patent Number: 5,503,641
[45] Date of Patent: Apr. 2, 1996

[54] PROCESS AND APPARATUS FOR PREPARING A POTASSIUM CHLORIDE MIXTURE

[75] Inventors: Ivan Bakardjiev, Hanover; Hans W. Beher, Salzdetfurth; Ingo Stahl, Vellmar, all of Germany

[73] Assignee: Kali und Salz Beteiligungs AG, Kassel, Germany

[21] Appl. No.: 252,735

[22] Filed: Jun. 2, 1994

[30] Foreign Application Priority Data

Jun. 3, 1993 [EP] European Pat. Off. .............. 93108894

[51] Int. Cl.$^6$ .................................................. C01D 3/24
[52] U.S. Cl. ............... 23/302 R; 23/297; 23/298; 23/301; 422/902
[58] Field of Search ....................... 422/261, 285, 422/289, 902, 281; 23/297, 298, 299, 301, 302 R

[56] References Cited

U.S. PATENT DOCUMENTS

| | | | |
|---|---|---|---|
| 681,407 | 9/1901 | Coward | 23/299 |
| 1,807,263 | 5/1931 | Walter | 422/902 |
| 2,164,112 | 6/1939 | Jeremiassen | 23/301 |
| 2,219,776 | 10/1940 | Henderson | 23/301 |
| 3,630,692 | 12/1971 | Green et al. | 23/301 R |
| 4,385,902 | 5/1983 | Haugrud | 23/293 R |
| 4,997,637 | 3/1991 | Tufts | 423/499 |

FOREIGN PATENT DOCUMENTS

| | | |
|---|---|---|
| 2852925 | 8/1980 | Germany. |
| 3129042 | 3/1982 | Germany. |
| 4014370 | 11/1990 | Germany. |
| 2080779 | 2/1982 | United Kingdom. |

OTHER PUBLICATIONS

Svanoe, "'Krystal' Classifying crystallizer", Industrial and Engineering Chemistry, vol. 32, No. 5, May 1940, pp. 636–639.

Saeman, "Crystal-size Distribution in Mixed Suspension", A.I.Ch.E Journal, vol. 2, No. 1, Mar. 1956, pp. 107–112.

Primary Examiner—Gary P. Straub
Assistant Examiner—N. M. Nguyen
Attorney, Agent, or Firm—Collard & Roe

[57] ABSTRACT

A potassium chloride mixture with grains of different sizes is extracted in a first stage with an unsaturated solution at an elevated temperature, whereby the finest grains are completely dissolved and the coarse proportions are caused to start dissolution, the purified medium fraction is transported into a second process stage and the previously dissolved amount of KCl is crystallized there onto the purified grains at a lower temperature, forming a product of high purity with a balanced grain size and a narrow grain spectrum.

8 Claims, 2 Drawing Sheets

PROCESS AND APPARATUS FOR PREPARING A POTASSIUM CHLORIDE MIXTURE

BACKGROUND OF THE INVENTION

1. Field of the Invention

The present invention relates to a process and an apparatus for treating a potassium chloride mixture with grains of different sizes, in particular with grains of up to 1.5 mm, in which the dry or moist potassium chloride is mashed with a potassium chloride solution and, in a continuous circulation, fed into a dissolving vessel.

2. The Prior Art

In Germany, crude salt obtained from potash deposits contains up to 75% sodium chloride and various secondary components such as magnesium and calcium in the form of chlorides, sulfates and bromides.

The quality standard of the potassium chloride produced therefrom has a content of valuable substances of about 60% to 62% $K_2O$, which conforms to a purity of 95% to 98% potassium chloride in the finished product.

In the extraction processes, traces of heavy metals (chromium, nickel, iron, molybdenum and vanadium) may get into the salt as well, conditioned by the materials of the plant equipment.

Since the impurities are present in different orders of magnitude, the problem of product refinement is manifold. An enhancement of the product primarily means increasing the overall purity, which has to be equated to a selective reduction of certain impurities.

Furthermore, for the use of the potassium chloride in practical life, the grain size or grain distribution plays an important role. If no "narrow grain cut" is desired exclusively, the "dust-free" product is desirable. Minimizing or eliminating the finest grains, which are responsible for the formation of dust, is one of the most important objectives.

In the discussion of processes already known for the production of potassium chloride products with higher purity, the fractionated crystallization of crude salt solutions is not addressed because a purity of more than 98% cannot be obtained with these known processes.

U.S. Pat. No. 4,385,902, which corresponds to German PS 2,852,925, proposes a process for the purification of potassium chloride crystals with a potassium chloride content of more than 97.5%, by extraction with a potassium chloride-saturated solution under isothermal conditions of 20° C. to 70° C. In this process, the sodium chloride content of the solution has to be under 35 g/L, preferably under 15 g/L. The treatment lasts 0.5 to 18 hours, whereby the rate of extraction process highly declines as the amounts of sodium chloride extracted increase. Seventy percent of the original sodium chloride content is extracted in the first four hours; the next 20% require a time expenditure of 12 hours. The rate of the process is highly dependent upon the size and structure of the grains and can be influenced only little by raising the temperature.

In addition to reducing the sodium chloride content as the main impurity, a reduction of the magnesium, calcium and bromine contents is found as well.

In German PS 3,129,042, an improvement of the process is achieved by using an extraction column operating countercurrently. In this case, sodium chloride concentrations in the treatment solution of up to 45 g/L are permissible; recommended is a concentration of less than 25 g/L. Another advantage is that it is possible also to purify coarser grains with a diameter of up to 4.7 mm.

German PS 4,014,370 specifies a digestion crystallization process in which small, contaminated crystals are flushed out in an aqueous medium together with larger, purer crystals. At the same time, a dissolution of the smaller crystals takes place, of which the order of magnitude is between 0.1 and 50 µm, and a growth of the potassium chloride product crystals occurs. Since no evaporation is required in order to obtain the product potassium chloride, this process operates with a substantially lower expenditure of energy than the recrystallization processes. Even though a crystal with enlarged grains is obtained in this process, the product obtained remains finely granular, overall.

In U.S. Pat. No. 681,407, recrystallization is carried out by heating the suspension under pressure. The subsequent relief and introduction of new components such as, for example, magnesium ions, lead to salting out.

Based on the current state of knowledge and technology for the purification of potassium chloride with potassium chloride solutions, the following steps were carried out for enhancing or optimizing the procedure.

As opposed to German PS 3,129,042, where it is assumed that "the inorganic salt impurities are generally evenly distributed over the potassium chloride particles," one has to expect in the purification of potassium chloride crystals a non-uniform distribution of the impurities, depending on the grain size. The coarser crystals are contaminated more by inclusions of mother liquid. On the other hand, with the smaller grains, which have a larger specific surface, the adhering amount of secondary components present in the solution increases. From this follows that the grains of different grain sizes have to be treated differently in order to achieve a uniform reduction of the impurities.

The extraction of the foreign substances by treating the potassium chloride grains with a solution is a heterogeneous process. The lower chemical potential of the impurities in the solution is the driving force permitting the emigration of the foreign substances until an equilibrium is adjusted. This is a typical diffusion process in which the rate decreases as the process progresses because profiles of concentration develop from the interior of the grains. In order to achieve a uniform elimination of the impurities, coarser grains have to be extracted longer than the finer grains under the same conditions.

Microscopic and other investigations have shown that in the crystallization of potassium chloride from aqueous solutions, no monocrystals are formed, but rather aggregates and agglomerates whose original particles can have different dimensions. Therefore, a specific behavior has to be expected in the treatment of different products. This requires higher flexibility in the adjustment of the process conditions.

It is known from German PS 2,852,925 that temperature increases lead to a measurable acceleration of the process; however, various negative factors occur at the same time.

Due to the increase in concentration in the potassium chloride solution, the amount of potassium chloride per ton of treated product is increased. Furthermore, higher evaporation rates lead to undesirable potassium chloride deposits on the treated grains. A maximum temperature of 60° C. to 70° C. is justifiable under these conditions.

Reducing the distance for the diffusion process by crushing of the grains is permissible only in a limited way because this enlarges the specific surface of the grains, which leads to an increase of the adsorption capacity and accumulation of the impurities on the surface of the grains.

A "controlled dissolving" of about 10% of the grain volume with undersaturated potassium chloride solution, on the other hand, leads to a process acceleration of about one decimal power. The higher the degree of dissolution, the more impurities are removed from the volume of the grains per unit of time. Starting dissolution of the grains has to take place uniformly. Due to break-up of the closed pores, such dissolution leads to a loosening of the grain structure, so that the grains can be cleaned of adhering impurities in a superior way.

SUMMARY OF THE INVENTION

It is an object of the present invention to achieve in the proposed process both a purity of the potassium chloride obtained of more than 98% pure, and to control the grain size in a selective way.

Consequently, another object of the invention is to provide a process in which the grains of different sizes are treated in different ways in order to remove the impurities and to obtain a product that is as pure as possible; furthermore, potassium chloride grains are to be produced that have a narrow grain size distribution and in each case a high degree of purity.

It is a further object is to create a process for the purification of potassium chloride by treatment with potassium chloride-containing solutions with the following advantages over the known processes:

1. Higher rate of the process;
2. Differentiated treatment, depending on the grain size proportions present;
3. Variable adjustment of the desired purity; and
4. Selective influencing of the grain size of the purified product.

According to the invention, these objects are achieved by (a) maintaining the potassium chloride suspended in the dissolving vessel by a circulating current;

(b) maintaining a certain temperature in the dissolving vessel and keeping the potassium chloride solution in the unsaturated state;

(c) completely dissolving the finer grains and keeping the coarser grains in the dissolving vessel until a medium grain size is obtained due to the dissolution process;

(d) withdrawing the grains with a medium size against the circulating current through an inside tube in the dissolving vessel;

(e) feeding the withdrawn KCl crystals together with the potassium chloride solution from the dissolving vessel to a crystallizer, in said crystallizer maintaining oversaturation by withdrawing heat, and in which the KCl crystals are maintained suspended by a circulating current; and (f) a sinking of the crystals occurs as the size of the KCl crystals increases, and withdrawing the sunk KCl crystals via a centrally arranged discharge tube in the crystallizer, and subjected as a salt mash to a separation process in the manner known per se.

Therefore, the first stage of the process, steps (a) to (d), provides for purification of the potassium chlorides grains by extraction accelerated by simultaneous dissolution. The NaCl content of the unsaturated solution is kept under 100 g/L, preferably under 70 g/L.

In the second stage steps, (e) to (f), recrystallization occurs, in which the dissolved potassium chloride deposits on the purified grains charged. For this purpose, the grains and the solution are transferred into another vessel, and the conditions required for crystallization are created by reducing the temperature.

The extraction temperature in the dissolving vessel can be in the range of 30° C. to 90° C., preferably, however, in the range of 50° C. to 70° C. In said range, optimal adjustment of the extraction rate, degree of recrystallization and amount of potassium chloride in the treatment solution are assured.

The temperature for the recrystallization in the crystallizer should have a difference of 10° C. to 40° C. as compared to the temperature in the dissolving vessel. Said temperature difference and the amount of solution transferred from the extraction range to the crystallization range determine the recrystallization rate of the process.

BRIEF DESCRIPTION OF THE DRAWINGS

Other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
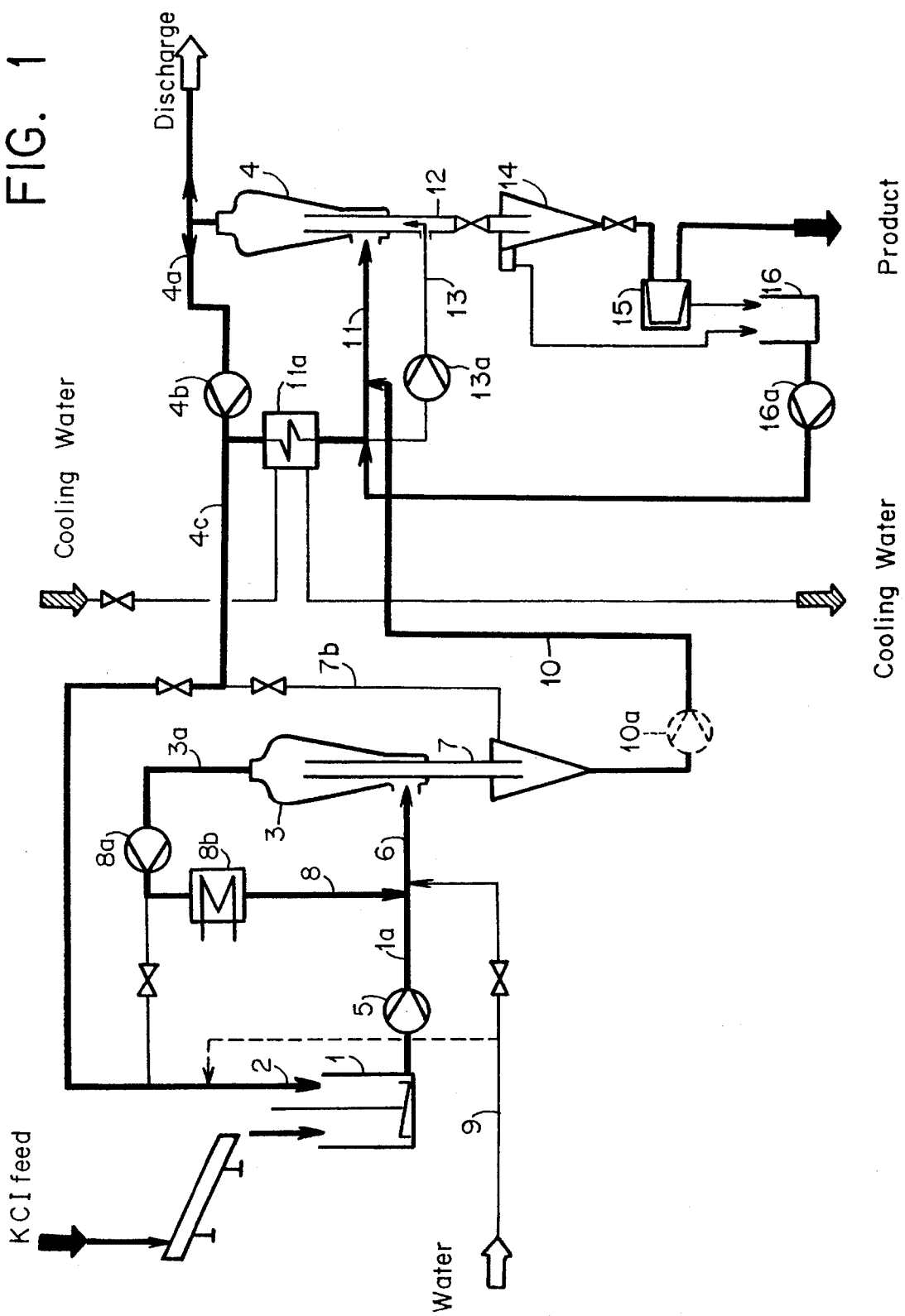
FIG. 1 shows the process schematically.

The starting potassium chloride is suspended in the mash 1 with the mashing solution 2, which is made up from the return solution from the crystallizer 4 (dissolving liquor 4a) and a portion of the solution circulation 8 of the dissolving vessel 3. With the pump 5, the feed mash is introduced into the dissolving vessel 3. In the dissolving vessel 3, undersaturation is adjusted, which leads to initial dissolution of the grains or complete dissolution of the smallest grains. The grains are maintained in suspension by means of a solution circulation 8. The required heat is introduced by a heat exchanger 8b in order to assure the desired temperature in the dissolving vessel 3. Through such initial dissolving, the coarser grains in the dissolving vessel 3 are reduced to a desired diameter. The cone-like, upwardly widening shape of the reactor permits a vertical classifying. Water can be fed into the dissolving circulation 8.

Through an inside tube 7, which through attachments can project into the dissolving reactor to different depths, the grains having a diameter smaller than the desired one are discharged. On the other hand, the grains having a sinking rate lower than the solution exiting rate remain in the dissolving circulation until they are completely dissolved.

The crystals withdrawn from the dissolving vessel are admitted into the crystallizer 4 by a withdrawing pump 10a. At the same time, a certain amount of solution 10 is withdrawn from a dissolving vessel 3 and fed into the crystallizer 4, where a lower temperature prevails. This leads to oversaturation in the crystallizer 4. In the crystallizer 4, and the grains are maintained in suspension by a circulation 11. The heat introduced is withdrawn by the heat exchanger 11a, and a temperature is assured that is lower than the one in the dissolving vessel 3. The control pump 13a permits through variable adjustment of the pumped volume the production of a crystallizate that is free of undersized grains. The grains discharged following recrystallization are collected by means of the withdrawal tube 12 in a salt mash vessel 14, and are subsequently separated from the mother liquor in the centrifuge 15. The filtrate is collected in the vessel 16 and pumped back into the circulation 11 by the pump 16a.

The solution 10 transferred from the dissolving vessel 3 into the crystallizer 4 transports the dissolved amount of potassium chloride from the treated specimen into the crystallization vessel, where this amount is deposited on the purified grains during recrystallization.

In order to permit a variable adjustment of the partial recrystallization, provision is made for a control circulator 7b. The temperature difference and the exchange of solution between the dissolving vessel 3 and the crystallizer 4 determine degree of recrystallization. The temperature in the dissolving vessel can be maintained between 30° C. and 90° C., whereby a value in the range of 50° C. to 70° C. is preferred. The adjustment of said temperature is assured by the heat exchanger 8b. A 10° C. to 40° C. lower temperature prevails in the crystallizer 4.

Figure 2:
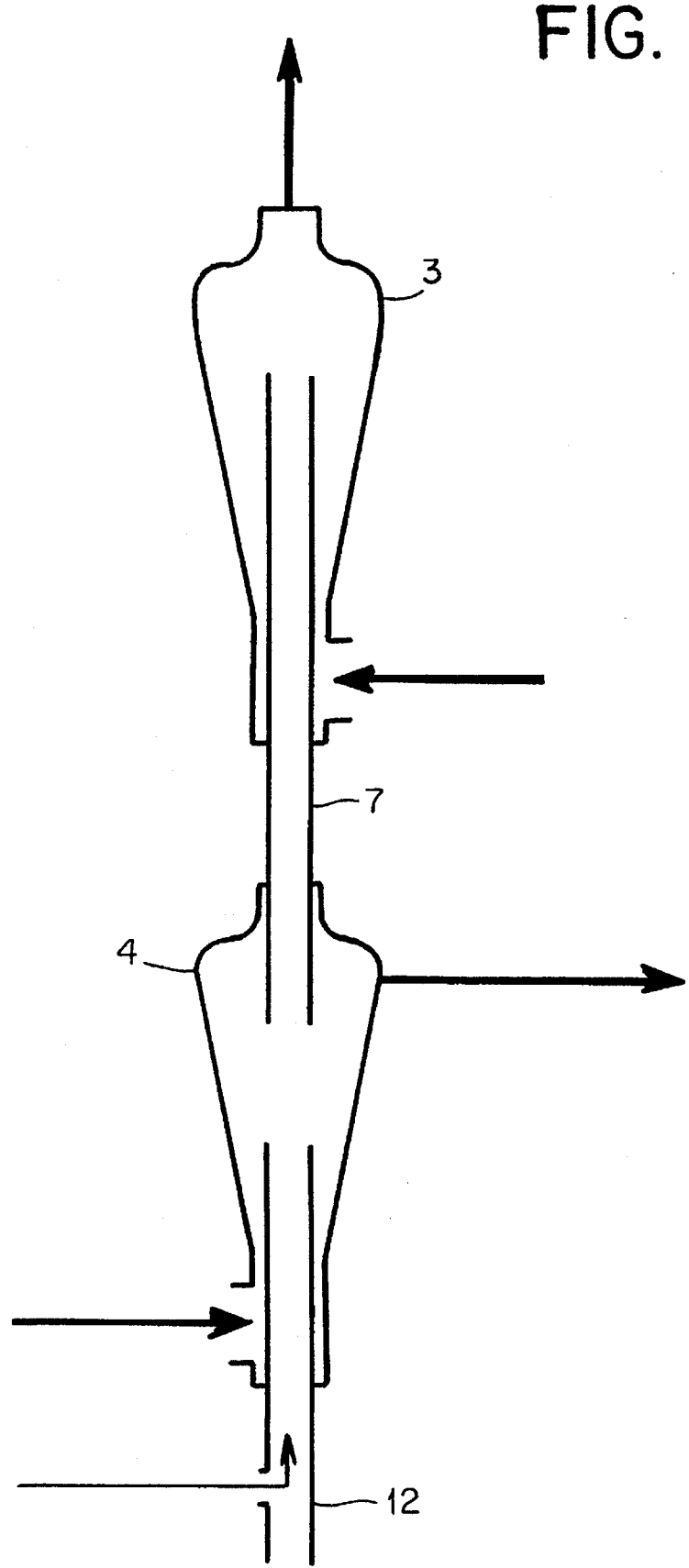
FIG. 2 shows a simplified reactor.

A simplification of the design of the process in terms of equipment can be realized by using a combined reactor (FIG. 2). The dissolving vessel 3' and the crystallizer 4' are directly connected to each other. The connection tube 7' serves as the connecting element, which permits the transfer of grains and solution from the extraction vessel into the crystallization vessel. In this case, the salt mash-withdrawing pump 10a is omitted.

In the following example, the potassium chloride crystallizate is treated under the following conditions:

Extraction temperature 60° C.

Crystallization temperature 35° C.

Through-put 0.5 kg/h

Sodium chloride content in the treatment solution 70 g/L

Recrystallization degree 20%

The starting and final data for the grain spectrum and the degree of purity achieved for the most important impurities are shown in Tables 1 and 2.

The main contaminant, sodium chloride, drops from 3.66 to 0.24% by weight in spite of a very high sodium chloride content in the treatment solution. Furthermore, the tables show a balanced distribution with respect to grain size.

At the same time, the grain spectrum has been clearly narrowed down. In particular, the proportion of finer grains has been highly reduced.

TABLE 1

STARTING PRODUCT

Grain Spectrum

| Grain Size (μm) | Amount (% by wt) | Main Impurities (% by weight) | | | | Trace elements (mg/kg) | | |
|---|---|---|---|---|---|---|---|---|
| | | NaCl | Mg | Ca | SO$_4$ | Cr | Ni | Fe |
| <160 | 3.6 | 3.02 | 0.12 | 0.08 | 0.36 | 0.15 | 0.12 | 8.5 |
| 200 | 8.1 | 2.85 | 0.10 | 0.09 | 0.31 | 0.08 | 0.06 | 3.0 |
| 250 | 14.6 | 3.03 | 0.09 | 0.09 | 0.30 | 0.08 | 0.05 | 3.6 |
| 315 | 17.5 | 3.35 | 0.10 | 0.09 | 0.33 | 0.05 | 0.03 | 2.5 |
| 400 | 20.4 | 3.69 | 0.11 | 0.10 | 0.36 | 0.04 | 0.03 | 2.5 |
| 500 | 19.4 | 4.07 | 0.12 | 0.10 | 0.40 | 0.04 | 0.03 | 3.0 |
| 630 | 12.0 | 4.50 | 0.13 | 0.11 | 0.42 | 0.03 | 0.03 | 2.5 |
| >630 | 4.3 | 4.90 | 0.14 | 0.12 | 0.47 | 0.04 | 0.04 | 2.5 |

TABLE 2

FINAL PRODUCT

Grain Spectrum

| Grain Size (μm) | Amount (% by wt) | Main Impurities (% by weight) | | | | Trace elements (mg/kg) | | |
|---|---|---|---|---|---|---|---|---|
| | | NaCl | Mg | Ca | SO$_4$ | Cr | Ni | Fe |
| <160 | 1.4 | 0.25 | 0.04 | 0.03 | 0.04 | 0.05 | 0.05 | 3.5 |
| 200 | 1.9 | 0.24 | 0.03 | 0.02 | 0.04 | 0.04 | 0.05 | 2.1 |
| 250 | 4.4 | 0.25 | 0.02 | 0.02 | 0.03 | 0.02 | 0.02 | 1.7 |
| 315 | 9.6 | 0.25 | 0.03 | 0.02 | 0.04 | 0.02 | 0.01 | 1.5 |
| 400 | 18.8 | 0.25 | 0.04 | 0.03 | 0.03 | 0.01 | 0.01 | 0.9 |
| 500 | 26.3 | 0.25 | 0.02 | 0.03 | 0.04 | 0.01 | 0.01 | 0.9 |
| 630 | 24.7 | 0.23 | 0.04 | 0.04 | 0.05 | 0.01 | 0.01 | 0.9 |
| >630 | 12.9 | 0.22 | 0.04 | 0.03 | 0.06 | 0.01 | 0.02 | 1.1 |

While several embodiments of the present invention have been shown and described, it is to be understood that many changes and modifications may be made thereunto without departing from the spirit and scope of the invention as defined in the appended claims.

What is claimed is:

1. A process for treating a potassium chloride mixture of grains with a diameter of up to a maximum of 1.5 mm which comprises:

a. adding said potassium chloride mixture of grains to a KCl solution to form a suspension mixture, wherein said suspension mixture comprises a fine grain fraction, a medium grain fraction and a coarse grain fraction, and wherein said KCl solution is unsaturated with KCl and said KCl solution is also unsaturated with NaCl;

b. passing the suspension mixture of step a. to a suspension dissolving vessel;

c. maintaining the temperature in the dissolving vessel in the range of 30° and 90° C.;

d. contacting the potassium chloride suspension mixture in said dissolving vessel with an upward flowing circulating current of unsaturated KCl solution;

e. classifying the KCl grains in said dissolving vessel with said upward flowing circulating current to keep the fine grain fraction entrained, the medium grain fraction suspended, and the coarse grain fraction suspended below said medium grain fraction;

f. completely dissolving the fine grain fraction and partially dissolving the coarse grain fraction;

g. withdrawing the potassium chloride medium grain fraction against the circulating current through a vertically adjustable inside tube in the dissolving vessel;

h. feeding the withdrawn potassium chloride medium grain fraction together with a portion of the potassium chloride solution from the dissolving vessel to a cooling classifying crystallizer having a temperature 10° to 40° C. lower than the temperature in the dissolving vessel to achieve oversaturation in the crystallizer, maintaining oversaturation by withdrawing heat to crystallize KCl onto the KCl medium grains, and maintaining the crystallized potassium chloride suspended by an upward flowing circulating current;

i. classifying the crystals as the size of the potassium chloride crystals increases, and withdrawing the potassium chloride product via a centrally arranged discharge tube in the crystallizer; and j. separating the KCl product in step i. from the liquid phase.

2. Process according to claim 1, comprising interconnecting a heat exchanger in the circulating current of unsaturated KCl solution of the dissolving vessel.

3. Process according to claim 1, comprising interconnecting a heat exchanger in the circulating current of the crystallizer.

4. Process according to claim 1, wherein the temperature in the dissolving vessel ranges between 50° C. and 70° C.

5. Process according to claim 1 comprising maintaining the sodium chloride content in the unsaturated solution of step (a) below 100 g/L.

6. Process according to claim 5, comprising maintaining the sodium chloride content in the unsaturated solution of step (a) below 70 g/L.

7. Process according to claim 1, comprising in step h., the withdrawn potassium chloride medium grain fraction together with the potassium chloride solution from the dissolving vessel is fed via a pump into the crystallizer.

8. Process according to claim 1, comprising in step h., the withdrawn potassium chloride medium grain fraction together with the potassium chloride solution from the dissolving vessel is fed directly into the crystallizer.

\* \* \* \* \*